Figure 1:
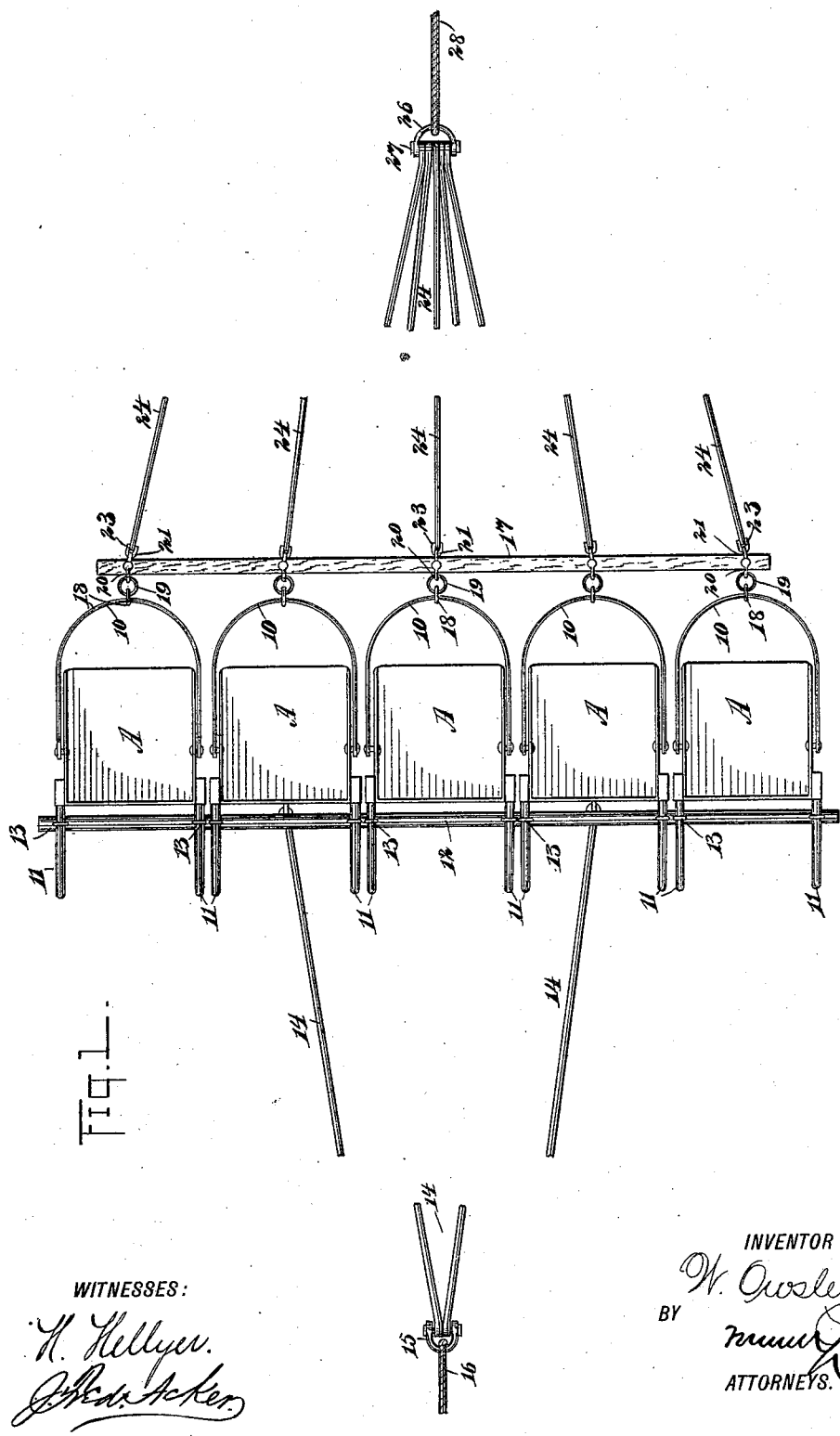

(No Model.) 2 Sheets—Sheet 1.

W. OWSLEY.
SCRAPER.

No. 574,757. Patented Jan. 5, 1897.

WITNESSES:
H. Hellyer.
J. Fred. Acker.

INVENTOR
W. Owsley
BY
[signature]
ATTORNEYS.

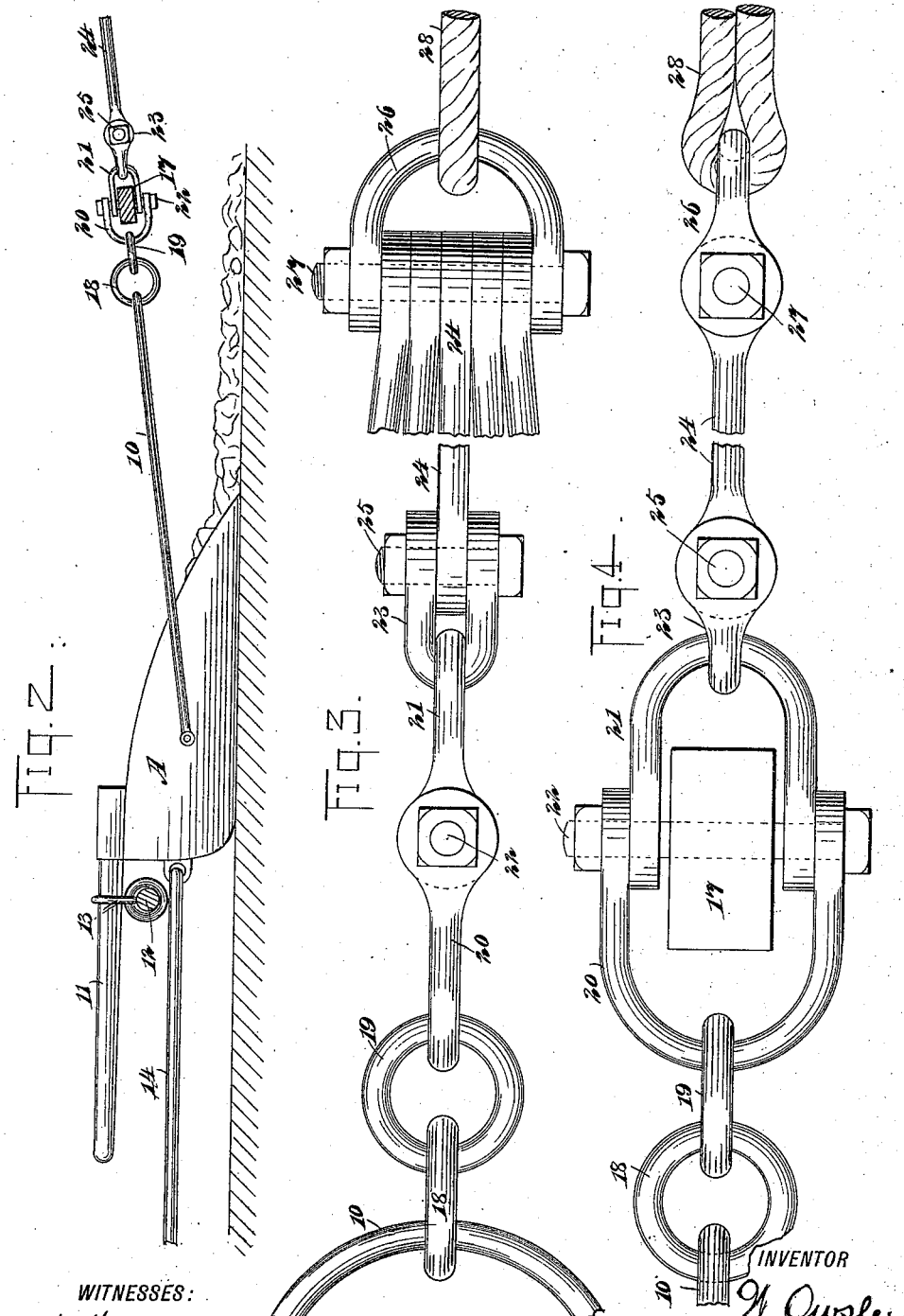

UNITED STATES PATENT OFFICE.

WILLIAM OWSLEY, OF TWIN BRIDGES, MONTANA.

SCRAPER.

SPECIFICATION forming part of Letters Patent No. 574,757, dated January 5, 1897.

Application filed July 28, 1896. Serial No. 600,766. (No model.)

*To all whom it may concern:*

Be it known that I, WILLIAM OWSLEY, of Twin Bridges, in the county of Madison and State of Montana, have invented a new and useful Improvement in Scrapers, of which the following is a full, clear, and exact description.

My invention relates to an improvement in scoops or scrapers; and the object of the invention is to provide a means whereby a number of scoops or scrapers may be connected in one gang, so that they will all act simultaneously in taking up material and in dumping the same, a gang of scrapers constructed as above alluded to tending to cheapen the cost in labor and power when undertaking any considerable job in grading or filling.

A further object of the invention is to construct the scrapers or scoops of a gang in a simple, durable, and effective manner and so that the machine may be operated by a motor of any description.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the gang of scrapers connected in accordance with my invention. Fig. 2 is a vertical section taken between two opposing scrapers and through the connecting-bars thereof. Fig. 3 is an enlarged plan view illustrating the manner in which the draft devices are applied to the bails of the scrapers; and Fig. 4 is a side elevation of the devices shown in Fig. 3, the spreader-bar connected therewith being in end view.

In carrying out the invention the scoops or scrapers A may be of any desired pattern, and each scoop or scraper is provided with a forwardly-extending bail 10, having pivotal connection with its sides. Each scoop or scraper is further provided at each side, near the top, with rearwardly-extending handles 11, and the handles of the various scrapers or scoops, the latter being placed side by side in a gang, are connected by means of a bar 12, and the connection between the bar and the handles is preferably accomplished, as shown particularly in Fig. 2, through the medium of pairs of links 13, a link of each pair being passed around the connecting-bar 12 and the other link of the pair being carried around a handle of a scraper. In this manner the rear ends of all of the scrapers are effectively connected and the scrapers will all move together.

A spacing-bar 17 is used to connect the various scoops or scrapers at the front of the same, and to that end the bail of each scraper is provided with a ring or link 18, connected with a second ring or link 19, the second ring or link being connected with a forwardly-extending clevis 20, into which a rearwardly-extending clevis 21 is entered. The spacing or spreader bar is passed between the two clevises, and pins 22 are passed through the clevises and through the said spacing-bar, as shown particularly in Figs. 2 and 4.

A grapple or yoke 23 is connected with the forward end of each forwardly-extending clevis 20, and a link or a cable 24 is passed between the members of each of the yokes 23 and pivotally connected therewith through the medium of pins or bolts 25, and the various cables or links are assembled at their forward ends and have eyes formed at said points, through which a bolt 27 is passed, passing also through a draft-clevis 26, in which the forward extremities of the cables or links are contained, and a draft-rope 28 is attached to the draft-clevis and carried to a spring-controlled drum or other device employed to give forward movement to the gang of scrapers. The central scrapers have cables 14 attached to their rear ends, and these cables are pivotally connected with a rear clevis 15, and the latter clevis 15 is connected by a cable 16 with the source of power, the cable 16 being used to return the gang of scrapers to a position to receive a load or to commence operations.

The entire machine is simple, it is durable and economic, and it is effective in operation.

Having thus described my invention, I claim as new and desire to secure by Letters Patent—

1. A scraper, comprising a plurality of bailed scoops or scrapers connected at the rear and having their bails connected with a spacing-bar, substantially as described.

2. In a machine for working dirt, a series of scrapers placed side by side in a gang, handles projected from the rear portions of the scrapers, a connecting-bar attached to the handles of the scrapers, bails attached to the said scrapers and extending forwardly therefrom, and a spreading-bar connected with the bails of all of the scrapers, as and for the purpose specified.

3. In a machine for working dirt, a gang of horizontally-arranged scrapers, a connecting-bar uniting the rear portions of the scrapers, bails projected from the forward portions of the scrapers, and a spacing-bar connected with the said bails, as and for the purpose set forth.

4. In a machine for working dirt, a gang of horizontally-arranged scrapers, a connecting-bar uniting the rear portions of the scrapers, bails projected from the forward portions of the scrapers, a spacing-bar connected with all of the said bails, a draft mechanism connected with the spacing-bar, and a return draft mechanism connected with the connecting-bar, as and for the purpose set forth.

5. In a machine for working dirt, the combination, with a gang of scrapers connected at the rear and provided with forwardly-extending bails, of a draft-clevis located at the front center of the gang of scrapers, a spacing-bar placed in front of the scraper-bails, and a connection between the said draft-clevis, the spacing-bar and each of the scraper-bails, as and for the purpose specified.

6. The combination, with a series of scrapers placed side by side and having rearwardly-extending handles, a connecting-bar secured to the said handles, and bails projected forwardly from each of the scrapers, of a spacing-bar placed in front of the bails, interlocking clevises pivotally connected with the spacing-bar in front of each bail, the said rear clevises having connection one with each bail of the scrapers, a draft-clevis, and cables connecting the outer clevises attached to the spacing-bar and the aforesaid draft-clevis, substantially as and for the purpose set forth.

WILLIAM OWSLEY.

Witnesses:
JOHN W. COTTER,
H. M. PATTERSON.